United States Patent
Kossey et al.

(10) Patent No.: US 11,349,883 B2
(45) Date of Patent: May 31, 2022

(54) DETERMINING RELEVANT SECURITY POLICY DATA BASED ON CLOUD ENVIRONMENT

(71) Applicant: AT&T INTELLECTUAL PROPERTY I, L.P., Atlanta, GA (US)

(72) Inventors: Samantha Kossey, Manasquan, NJ (US); Rebecca Finnin, Atlanta, GA (US); Christine Liu, Middletown, NJ (US); Amy Zwarico, Mountain Brook, AL (US); Luba Droizman, Boca Raton, FL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 66 days.

(21) Appl. No.: 16/879,360

(22) Filed: May 20, 2020

(65) Prior Publication Data
US 2021/0367980 A1 Nov. 25, 2021

(51) Int. Cl.
*H04L 29/06* (2006.01)
*H04L 9/40* (2022.01)
*H04L 69/321* (2022.01)
*H04L 67/1001* (2022.01)

(52) U.S. Cl.
CPC ........ *H04L 63/205* (2013.01); *H04L 67/1002* (2013.01); *H04L 69/321* (2013.01)

(58) Field of Classification Search
CPC .. H04L 63/205; H04L 67/1002; H04L 69/321
See application file for complete search history.

(56) References Cited

U.S. PATENT DOCUMENTS

| | | | |
|---|---|---|---|
| 9,560,079 B1* | 1/2017 | Lucovsky | H04L 63/10 |
| 2013/0117563 A1* | 5/2013 | Grabelkovsky | G06F 16/00 |
| | | | 713/165 |
| 2014/0020072 A1* | 1/2014 | Thomas | H04L 63/102 |
| | | | 726/7 |
| 2014/0130142 A1* | 5/2014 | Plewnia | H04L 63/102 |
| | | | 726/5 |
| 2016/0212176 A1* | 7/2016 | Lango | G06F 16/188 |
| 2018/0255101 A1* | 9/2018 | Adam | H04L 63/10 |
| 2018/0302337 A1* | 10/2018 | Zhao | G06F 9/50 |
| 2018/0302442 A1* | 10/2018 | Lucovsky | G06F 21/62 |
| 2018/0316730 A1* | 11/2018 | Schaefer | H04L 41/0803 |

* cited by examiner

*Primary Examiner* — Mohamed A. Wasel
(74) *Attorney, Agent, or Firm* — Amin, Turocy & Watson, LLP

(57) ABSTRACT

A system and method for returning security policy requirements data based on user input that identifies a cloud environments, a service model, first or third party responsibilities, and/or code deployment information. A user provides answers to straightforward, generally non-expert questions directed to the user's cloud environment, first or third party responsibilities, and/or code deployment information for the user's scenario, e.g., technical workload. The answers result in determining which architecture layers apply (are in-scope architecture layers) relevant to the user's scenario. The in-scope architecture layers map to security requirements maintained in a security policy data store. The security requirements are returned (e.g., as a list) in response to the user's answers.

20 Claims, 13 Drawing Sheets

FIG. 4        440

DETERMINING RELEVANT SECURITY POLICY DATA BASED ON CLOUD ENVIRONMENT

TECHNICAL FIELD

The subject application relates to cloud environments, and more particularly to determining security policy data based on a cloud environment and associated information determined via user interaction with program questions, and related embodiments.

BACKGROUND

Securing systems such as cloud-based systems is increasingly important. There is thus security policy data describing various security requirements that need to be complied with for a given enterprise.

However, it is challenging for users to determine the relevant security requirements for a given scenario. To determine which security requirements apply to a particular technical workload, a user accesses security policy data, which, for example, can be maintained as many thousands of discrete control points in a policy data store. This is a massive undertaking for someone to go through manually, and indeed, this often involves tedious manual intervention from a security expert. In sum, users do not have an efficient way to navigate through the voluminous security policy bases to ensure they are compliant with the security requirements that are relevant to their technical workloads.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
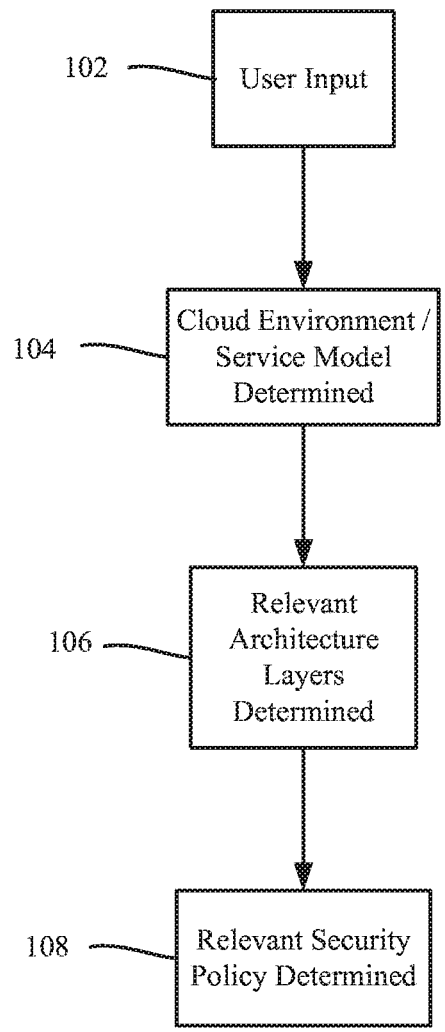
FIG. 1 illustrates a general, example process flow for obtaining relevant security policy, in accordance with various aspects and embodiments of the subject disclosure.

The technology described herein is generally directed towards an interactive program, such as a web application, that takes user input about a user's particular technical workloads and maps that input to a relevant, tailored list of individual requirements from a first party enterprise's security policy requirements (1SPR) as maintained in a suitable data store. In one implementation, a user without any specialized knowledge of security can interact with the program, and obtain only the appropriate security requirements (e.g., in a readable list) for the user to observe. The technology saves significant time and resources time for technical teams trying to meet their security requirements and in turn improves the overall security of an enterprise (e.g., a system/organization).

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

FIG. 1 shows a general operational flow, in which user input 102 is used to determine a cloud environment and associated service model 104 as described herein. Based on the user input-established cloud environment and associated service model 104, the architecture layers 106 (e.g., application layer, operating system layer, etc.) that are in-scope for that cloud environment and associated service model 104 are used to map to security requirements for those layers. This solution effectively maps user input to security policy requirements in a highly efficient manner.

Figure 2:
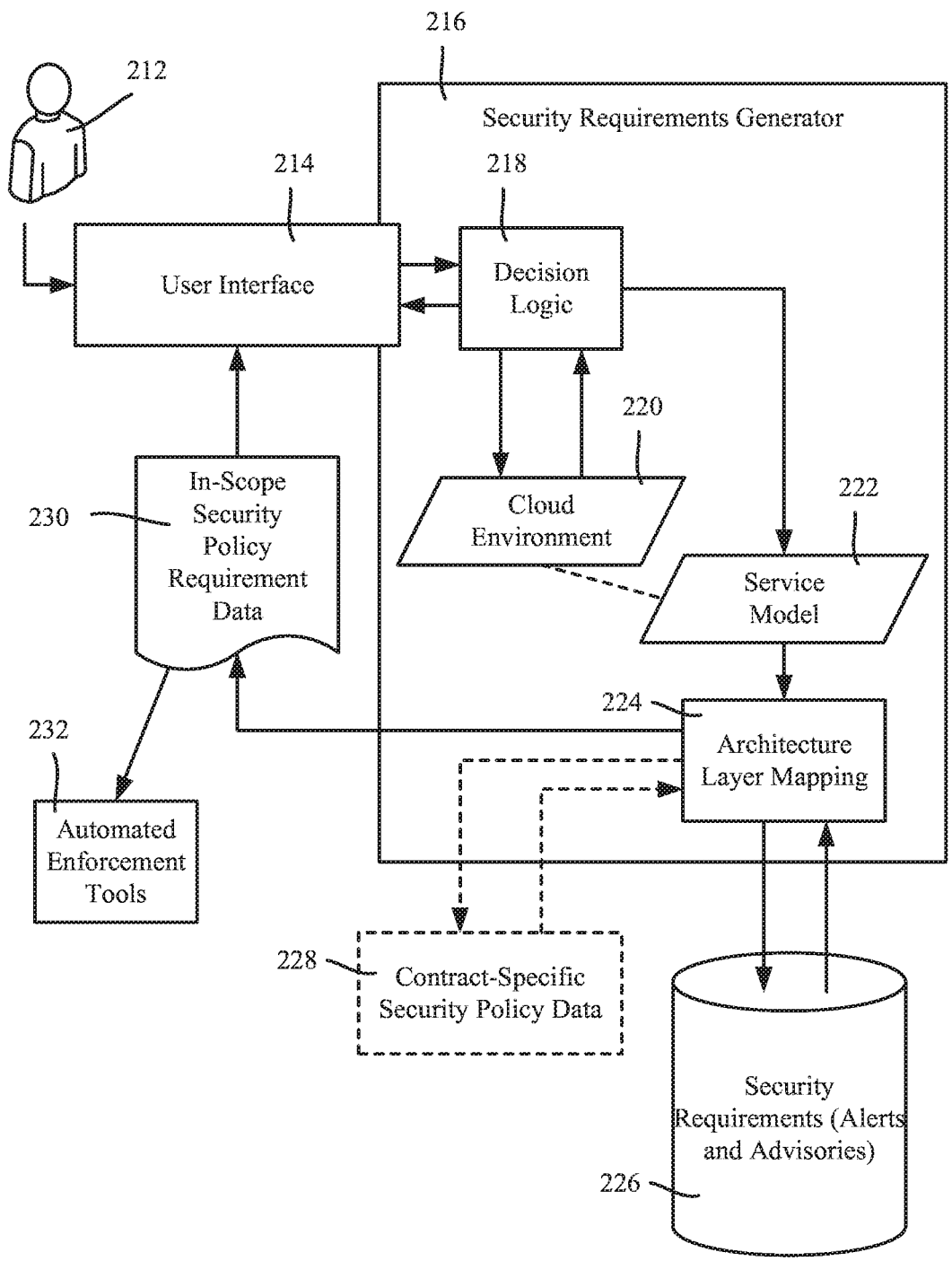
FIG. 2 is a block diagram representing example components and data flow to a program for generating relevant security policy results based on various user input corresponding to possible cloud environment, responsibilities, code deployment and/or service model results, in accordance with various aspects and embodiments of the subject disclosure.

FIG. 2 shows additional details, in which a user 212 interacts via a user interface 214 with a security requirements generator program 216, e.g., a web application. The user interface 214 can be based on any suitable input and output device capable of presenting the security requirements generator program's output and receiving information, e.g., a mobile device, a personal computer with keyboard and mouse and/or voice recognition, and so on.

One suitable user interface output that the security requirements generator program 216 can provide to receive the user input can be in the form of a question-and-answer wizard. The answers can be obtained via yes/no answers to straightforward, generally non-expert questions, and/or via selection boxes such as checkboxes and radio buttons. The answers to the questions are intended to be such that limited technical and security knowledge is learned by a user.

As will be understood, decision logic 218 of the security requirements generator program 216 is used to determine follow-up questions. For example, the answer to the question "What is your cloud environment?" can be a choice of a first-party enterprise cloud environment or a third-party enterprise environment. The answer is processed by the decision logic 218 to determine a next question, and so on if needed, until the user's cloud environment data 220 and associated service model data 222 is known to the security requirements generator program 216.

Based on the service model 222, an architecture layer mapping module 224 maps the architecture layers to their security requirements. This can include obtaining security alerts and advisories for the architecture layers that correspond to the service model data 222 from the enterprise data store 226.

In some scenarios, contract-specific security policy data 228 also may be part of the requirements. For example, contracts between the first party enterprise and a third party enterprise such as a supplier may specify certain security alerts and advisories with which a technical team is to comply. The architecture layer mapping module 224 can include or be coupled to a data store or a contract processing-engine to obtain such contract-specific security policy data 228.

Figure 3:
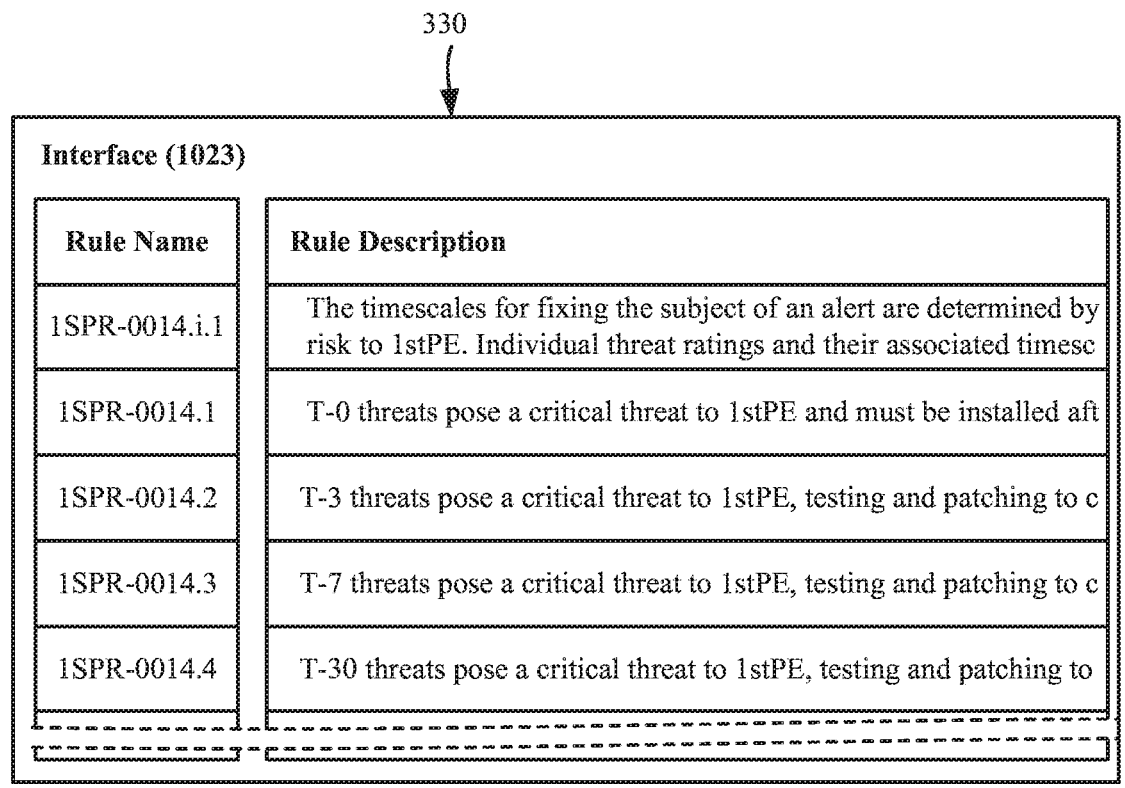
FIG. 3 is an example of partial security policy requirements data that can be returned to a user, in accordance with various aspects and embodiments of the subject disclosure.

When the relevant (in-scope) security policy data is obtained, the results are returned to the user. For example, a list 230 or other such document can contain human-readable content. FIG. 3 shows an example in the form of a partial list 330 of how such a human readable content can be formatted.

In addition to returning the list 230, the security policy data can be provided in some form (not necessarily human readable) to automated enforcement tools 232 or the like. Such tools can be used to enforce at least some of their enterprise's security policies, as well as to guide users on how to resolve any flagged potential security issues.

Figure 4:
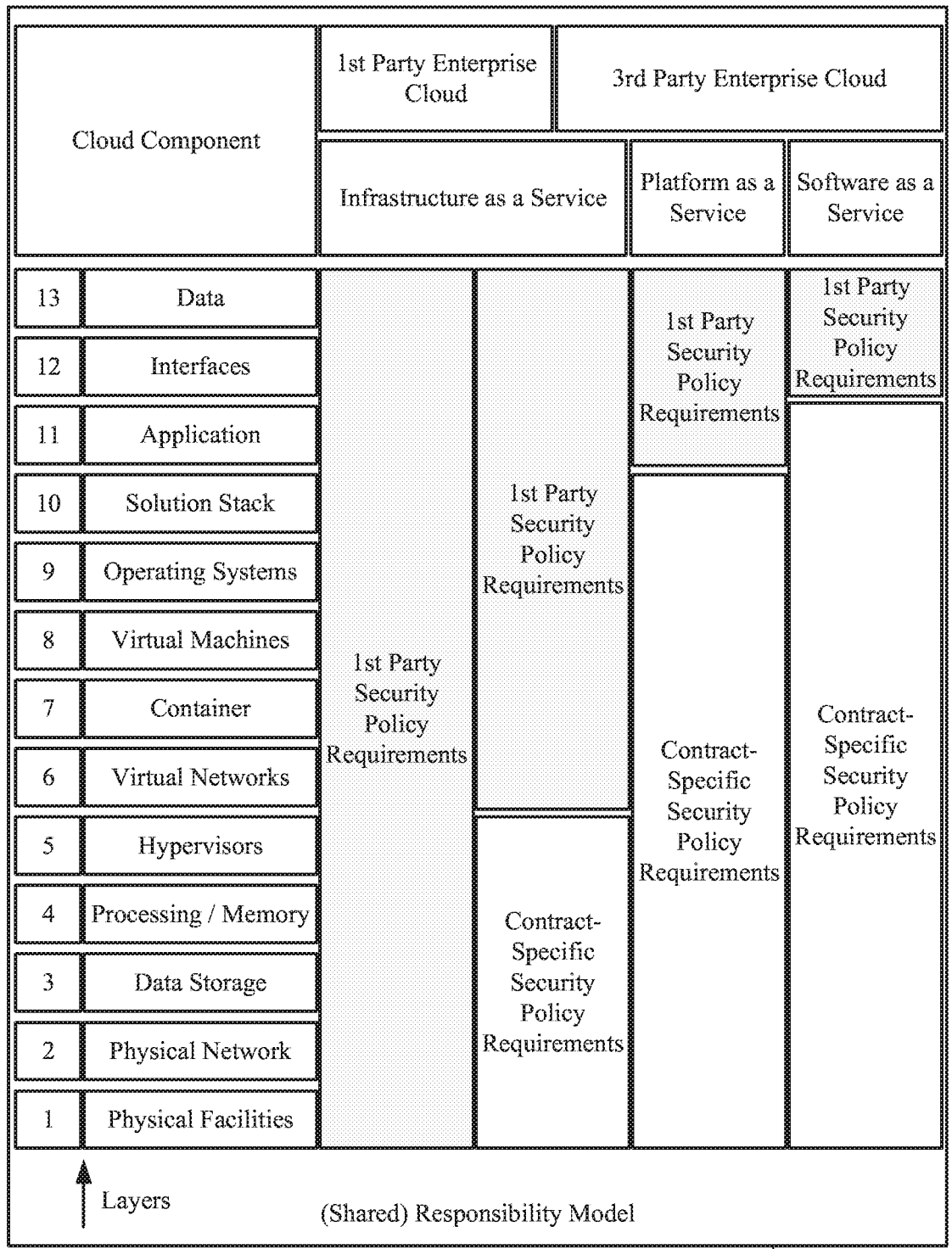
FIG. 4 is an example of architecture layers, cloud and other service models, and first or third party responsibility-based differentiation, in accordance with various aspects and embodiments of the subject disclosure.

FIG. 4 shows an example of a responsibility model 440, which can be shared between first and third party enterprise cloud service providers or the like. As can be seen, thirteen architecture layers are listed in the example of FIG. 4, and which party's security policy requirements can be determined via the various service models. For example, for a first party enterprise that provides infrastructure as a service, the first party enterprise security policy requirements are to be used for any of the thirteen architecture layers to which a given scenario applies. As another example, for a third party enterprise that provides software as a service, the first party enterprise security policy requirements are to be used for the data and interface architecture layers, while contract-specific security policy requirements are used for any of the other architecture layers to which a given scenario applies.

Figure 5:
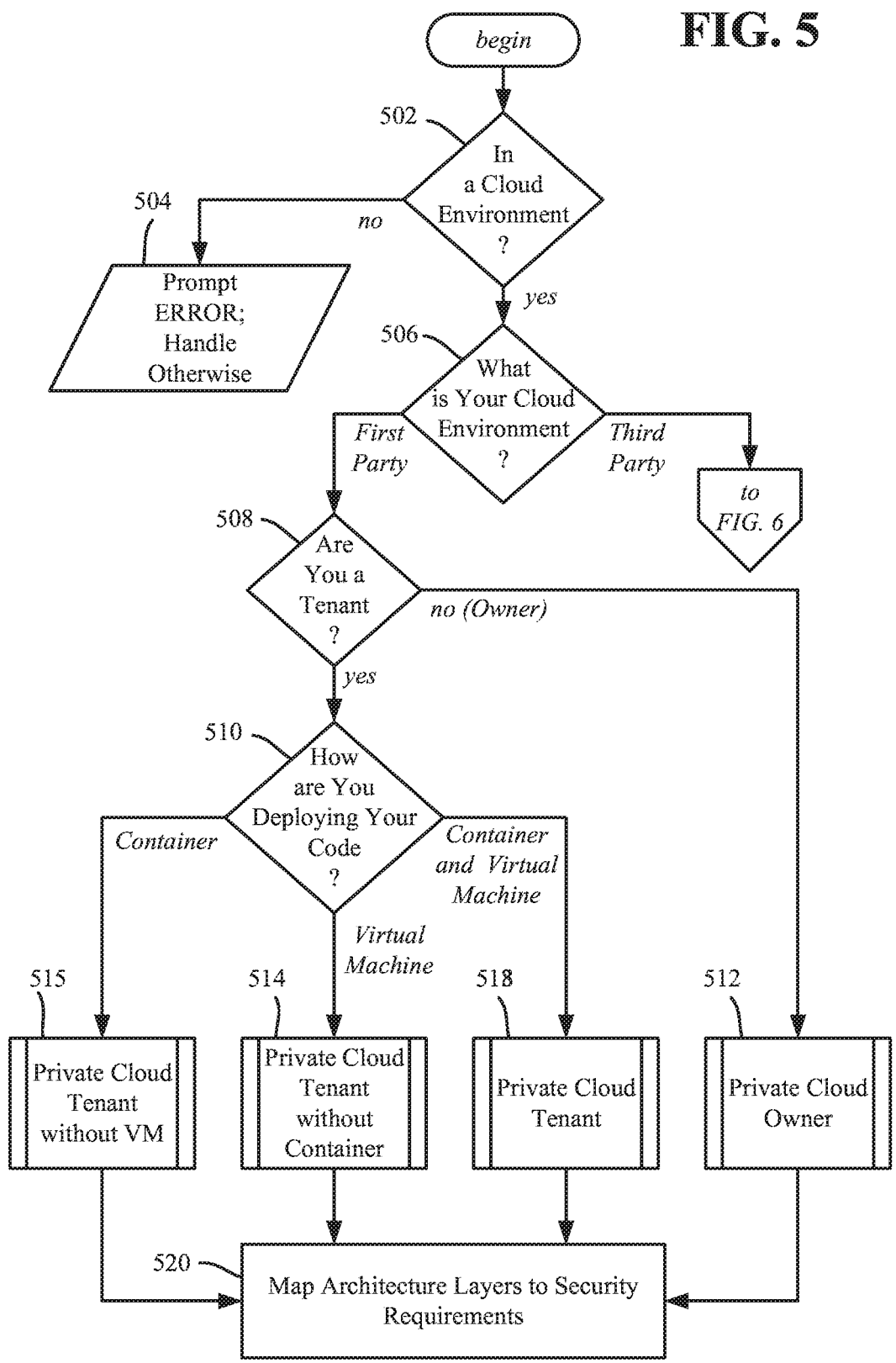
FIGS. 5 and 6 comprise a flow diagram showing example operations performed in response to user answers to questions, in which the operations map to architecture layers that map to security requirements, in accordance with various aspects and embodiments of the subject disclosure.
Figure 6:
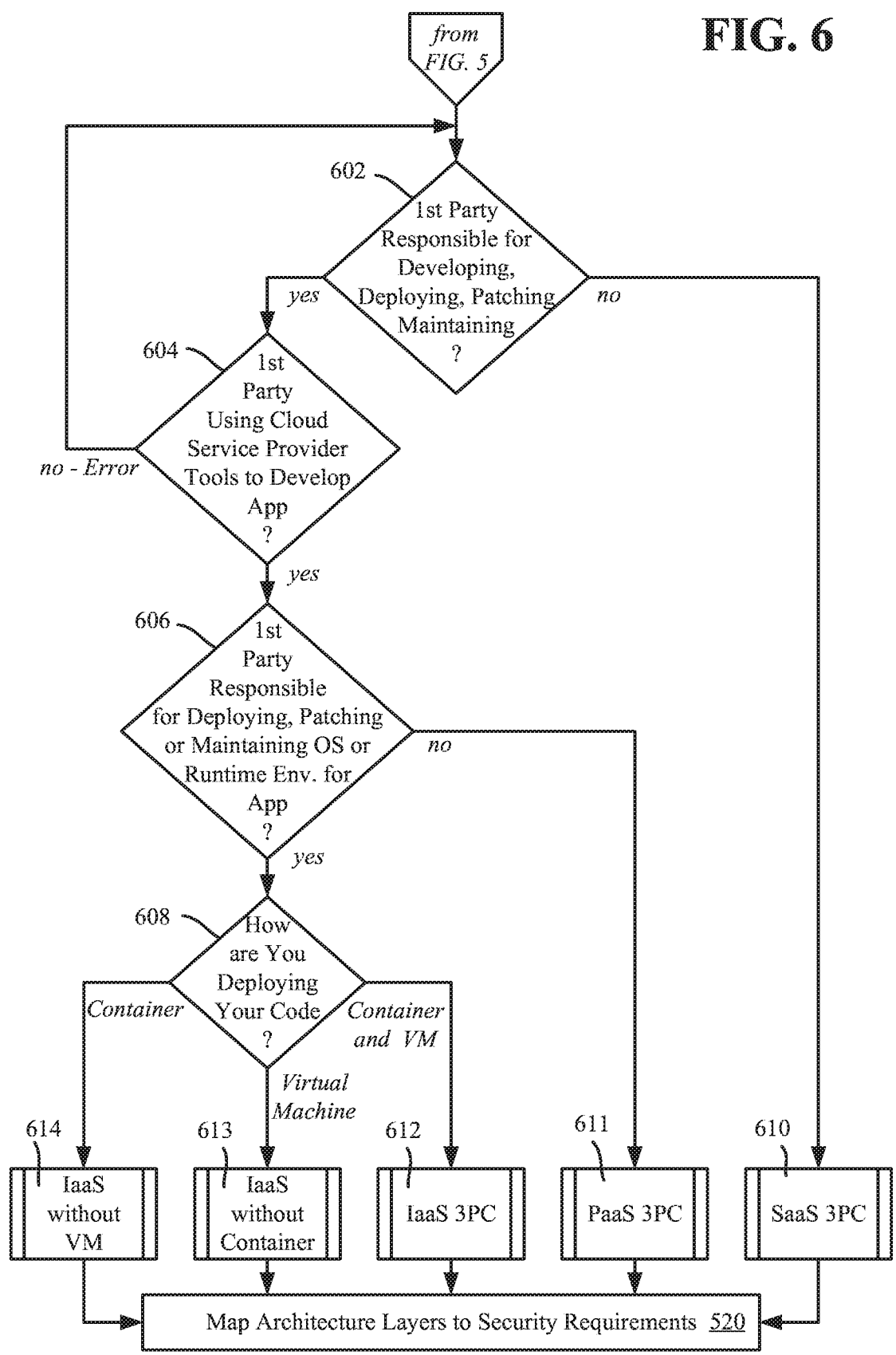

FIGS. 5 and 6 shows an example of how the security policy generator 216 (FIG. 2) including the decision logic 218 can use user input to return the appropriate security policy data. Operation 502 represents querying for whether the user is in a cloud environment. In the example of FIG. 5, a "no" answer is an error, meaning that the user perhaps does not understand the scenario. However, it is feasible that a "no" answer can map to a different environment, such as a local network environment that has its own security policies.

In the example of FIG. 5, for a "yes" answer, a subsequent question inquires as to the user's cloud environment, namely first party enterprise cloud or third party enterprise cloud. As can be readily appreciated, a radio button control or the like along with a "Next" button or the like can be used for obtaining this answer. As is understood, for a scenario in which "local network," "first party enterprise cloud" or "third party enterprise cloud" are the only possibilities, a single radio button control can be used to obtain the answer for both operations 502 and 506. The logic for a third party enterprise cloud is shown in FIG. 6.

For a first party enterprise cloud user, a subsequent question inquires as to whether the user is operating as a tenant or a private cloud owner. If the user is not a tenant, that is, is an owner, then the cloud environment and service model is known, which can be mapped to the architectural layers applicable to a private cloud owner (block 512).

If the user is a tenant, then block 508 branches to block 510 to inquire as to how the code is being deployed, namely via container, via virtual machine or via both container and virtual machine. Radio button-based selection can be used to ensure that one of the three possible code deployment scenarios is selected. The result of the answer is shown in one of blocks 512, 513 or 514.

Note that while FIG. 5 shows textual results in blocks 512-515, e.g., "Private Cloud Owner" in block 512 or a separate result for different types of "Private Cloud Tenants" in one of the blocks 513-515, this is only for readability and explanation purposes, which can remain invisible to the user. Indeed, instead of text, each of the blocks can contain a set (e.g., a list) of its applicable layers. For example, for a private cloud tenant without virtual machine (VM), the result set in the result block 515 would include an identifier of architecture layer 7 "container" along with its other applicable layers, but not the architecture layer 8 "virtual machine" identifier; whereas the result set in the result block 514 would include an identifier of the architecture layer 8 "virtual machine" identifier along with its other applicable layers, but not the architecture layer 7 "container" identifier.

In theory, it is possible to have each result block directly list the security policy requirements. However, for any given result block this is likely to be a large list that is highly redundant with other such lists, and moreover, security policies are likely to be changed, deleted or added to a layer relatively frequently. As such, it is highly likely to be more efficient to map the answers to one of the possible result sets of architecture layer identifiers, and then use the architecture layer identifiers to obtain the security policy data for each.

Returning to operation 506 of FIG. 5, third party enterprise cloud environments are handled by branching to operation 602 of FIG. 6. Operation 602 inquires as to the first party enterprise's responsibilities, e.g., whether the first party enterprise is responsible for developing, deploying, patching and/or maintaining the software being considered. If not, the result is summarized in block 610, namely software as a service (SaaS) third party cloud (3PC), which in the example of FIG. 4 maps to first party security policy requirements for the data and interfaces architecture layers, any the contract-specific security policy requirements for other architecture layers.

If the first party is not responsible at operation 602, then operation 604 inquires as to whether the first party enterprise is using tools provided by the cloud service provider to develop the application. If not, then in this example there is an error, as the third party enterprise needs to be involved somehow; thus, operation 604 acts as a double-check as to whether the user correctly answered the inquiry of operation 602.

The "yes" branch of operation 604 reaches operation 606, which inquires whether the first party enterprise is responsible for deploying, patching or maintaining the operating system or runtime environment for the application software under development. If not, then the resultant service model/cloud environment is platform as a service (PaaS) third party cloud (3PC), block 611, which maps to applicable architecture layers. For example in FIG. 4, this is the first party security policy requirements for the data, interfaces and application architecture layers, and any contract-specific security policy requirements for other architecture layers.

The "yes" branch of operation 606 reaches operation 608, which (similar to the above description of operation 510 of FIG. 5), inquires as to how the code is being deployed, namely via container, via virtual machine or via both container and virtual machine. The results of FIG. 6 shown in blocks 612-614 are for infrastructure as a service (IaaS), (in contrast to the private cloud tenant results of FIG. 5). These results are mapped (block 520) via the applicable architecture layers to the appropriate first party enterprise and third party enterprise service requirements.

Figure 7:
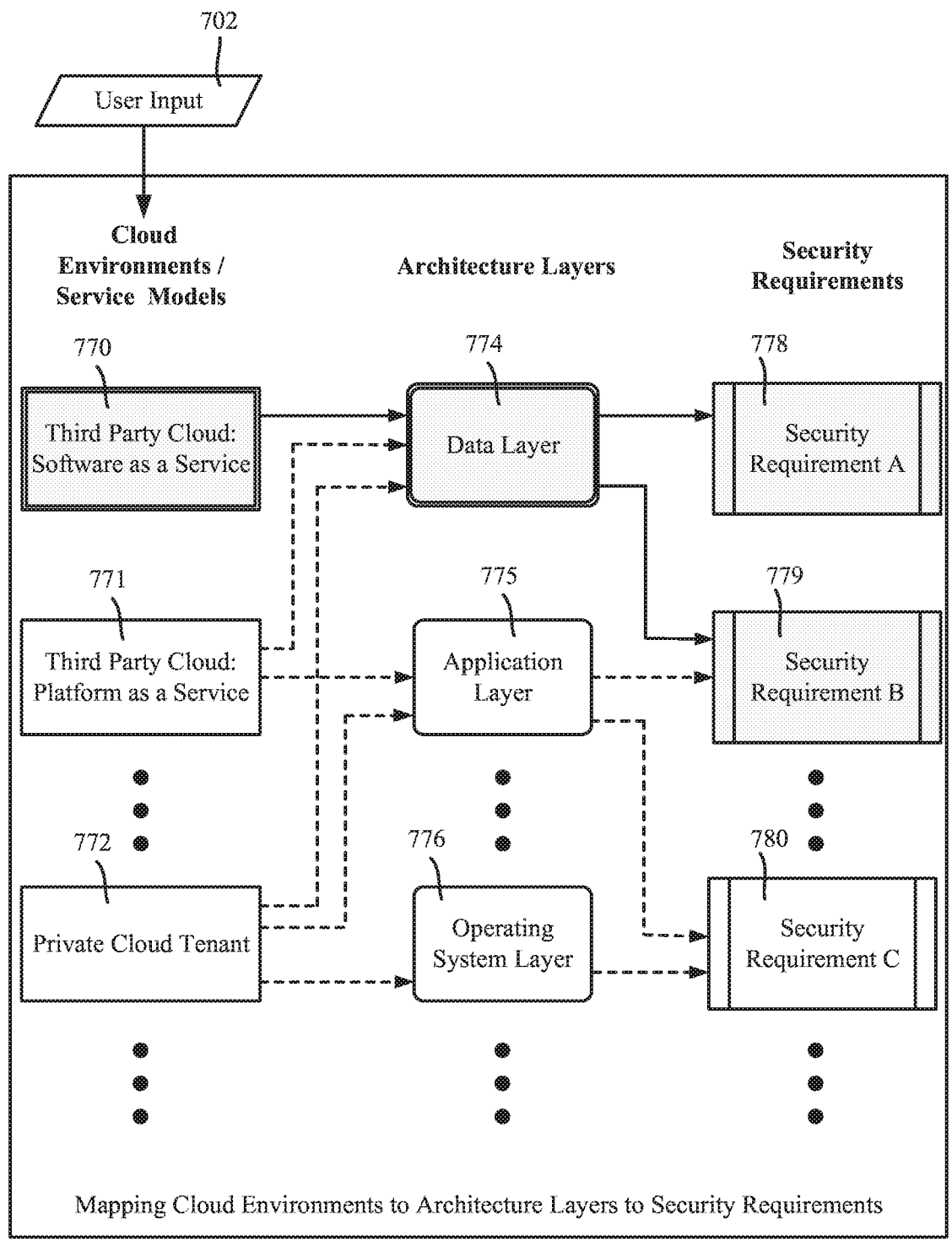
FIG. 7 is a block diagram representing security requirements being generated based on user input that indicates a software as a service technical workload, in accordance with various aspects and embodiments of the subject disclosure.

FIG. 7 shows a partial example of how security requirements are generated based on an instance 702 of user input that results in third party cloud software as a service (block 770, corresponding to block 610 of FIG. 6 being selected. In the (partial) example of FIG. 7, it is seen that the user input answers that result in third party cloud software as a service (block 770) being determined map to (is joined with) data architecture layer (block 774). In turn, data architecture layer (block 774) maps to (is joined with) security requirement A (block 778) and security requirement B (block 779). For purposes of clarity, the relevant blocks are shown shaded in FIG. 7, and connected by solid arrows, while other blocks are shown unshaded and connected by dashed arrows.

Figure 8:
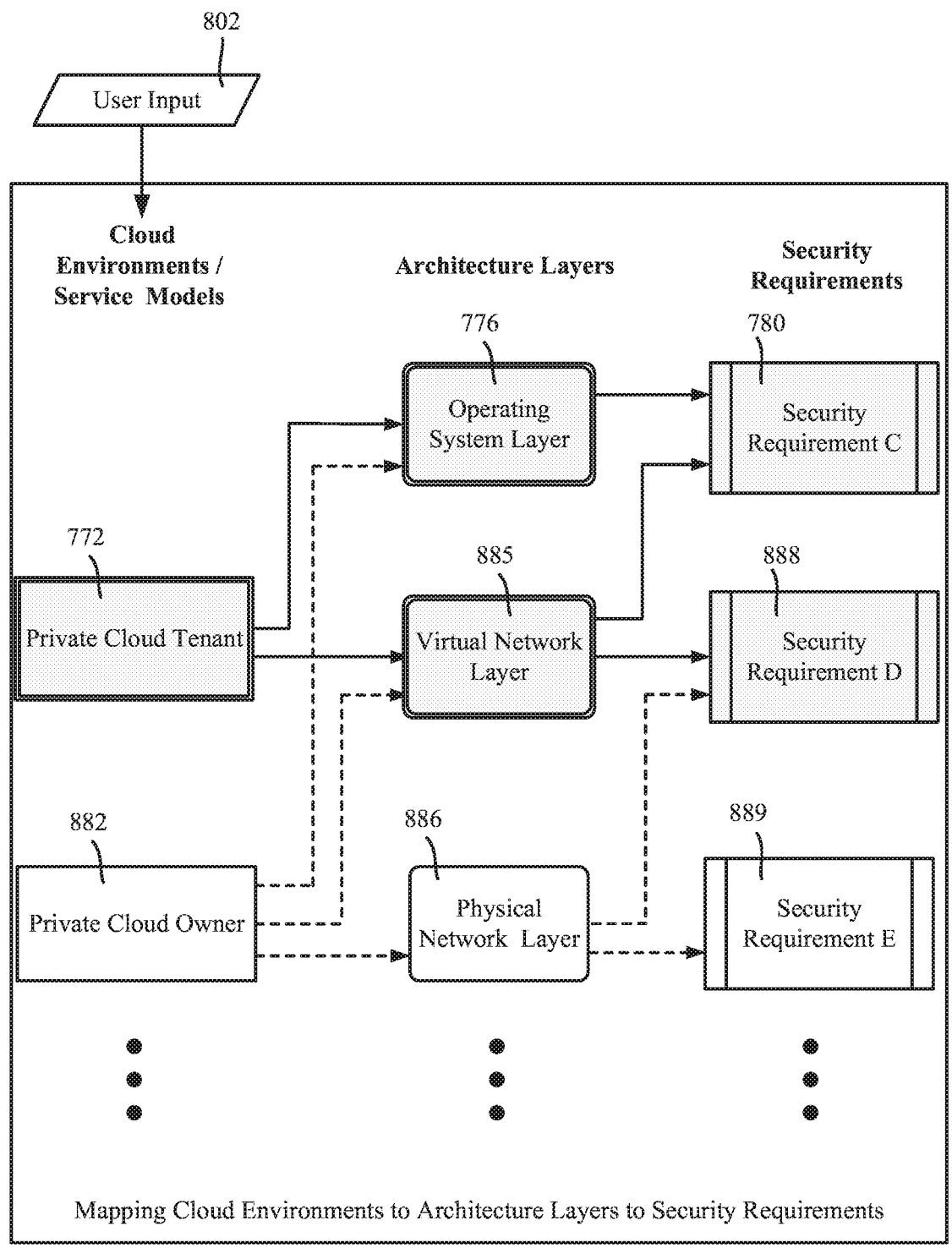
FIG. 8 is a block diagram representing security requirements being generated based on user input that indicates a private cloud tenant technical workload, in accordance with various aspects and embodiments of the subject disclosure.

FIG. 8 shows a different (partial) example, namely for a private cloud tenant (block 772), using the same shaded block and solid arrow path for relevant blocks). The answers for user input instance 802 result in a private cloud tenant (block 772) being determined, which maps to operating system (block 776) and virtual network (block 885) architecture layers, which in turn map to security requirement C (block 780) and security requirement D (block 888) respectively. Other layers and corresponding security requirements are not shown for purposes of brevity.

As represented in the partial example of FIG. 8 a security requirement can be the same for two architecture layers, e.g., the security policy C (block 780) applies to both the operating system architecture layer (block 776) and the virtual network architecture layer (block 885). A union of the mapped-to security requirement sets can be used to eliminate redundancy in the final results returned to the user.

Figure 9:
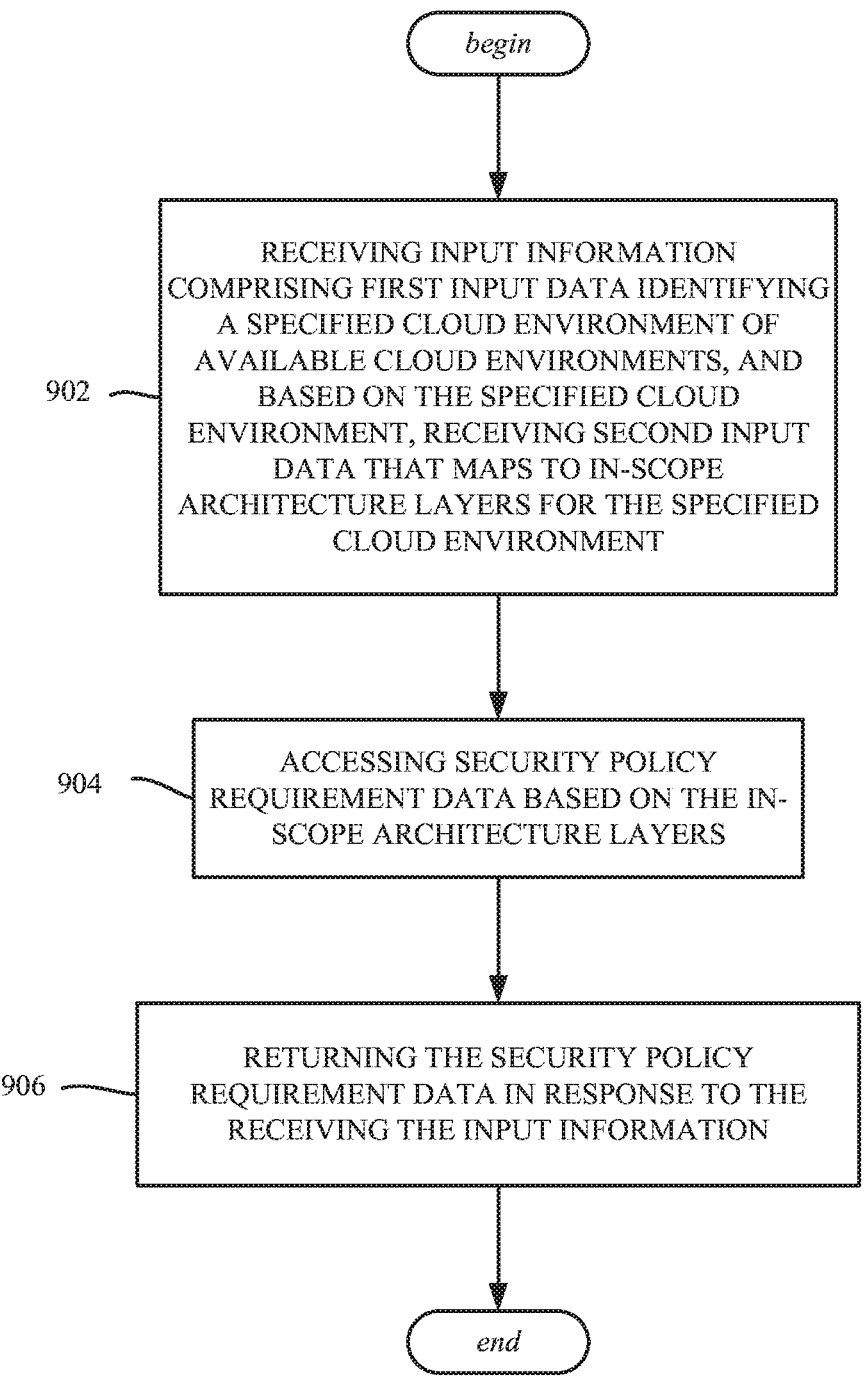
FIG. 9 illustrates example operations that return security policy requirement data based on user input that maps to in-scope architecture layers, in accordance with various aspects and embodiments of the subject disclosure.

One or more example aspects are represented in FIG. 9, and can correspond to a system, comprising a processor, and a memory that stores executable instructions that, when executed by the processor, facilitate performance of operations. Example operation 902 represents receiving input information comprising first input data identifying a specified cloud environment of available cloud environments, and based on the specified cloud environment, receiving second input data that maps to in-scope architecture layers for the specified cloud environment. Example operation 904 represents accessing security policy requirement data based on the in-scope architecture layers. Example operation 906 represents returning the security policy requirement data in response to the receiving the input information.

The first input can indicate a first party enterprise cloud environment, and at least part of the security policy requirement data can be first party enterprise security policy requirement data.

The second input can include a first input part that differentiates between a cloud owner and a cloud tenant, and for a cloud tenant, the second input further can include a third input part that identifies code deployment implementation information that maps to a result set corresponding to the in-scope architecture layers.

The code deployment implementation can map to a container without virtual machine result set, a virtual machine without container architecture layer result set, or a virtual machine and container result set.

Receiving the first input identifying the specified cloud environment can include receiving user input indicating a third party enterprise cloud environment, and at least part of the security policy requirement data can be contract-specific security policy requirement data. At least part of the second input can identify first party responsibility information. The first party responsibility information can differentiate between an infrastructure as a service (IaaS) service model, a platform as a service (PaaS) service model or a software as a service (SaaS) service model. The service model can be the IaaS service model, and at least part of the second input can include code deployment implementation that maps to an IaaS container without virtual machine result set, an IaaS virtual machine without container result set, or an IaaS virtual machine and container result set.

Receiving the first input identifying the specified cloud environment can include receiving user input indicating a third party enterprise cloud environment, and wherein that part of the second input can identify first party enterprise responsibility information.

Determining which architecture layers are in-scope architecture layers can include determining at least one of: a data layer, an interfaces layer, an application layer, a solution stack layer, an operating systems layer, a virtual machines layer, a container layer, a virtual networks layer, a hypervisors layer, a processing and memory layer, a data storage layer, a physical network layer or a physical facilities layer.

Further operations comprise, presenting a question and answer interactive user interface for receiving the input information.

Figure 10:
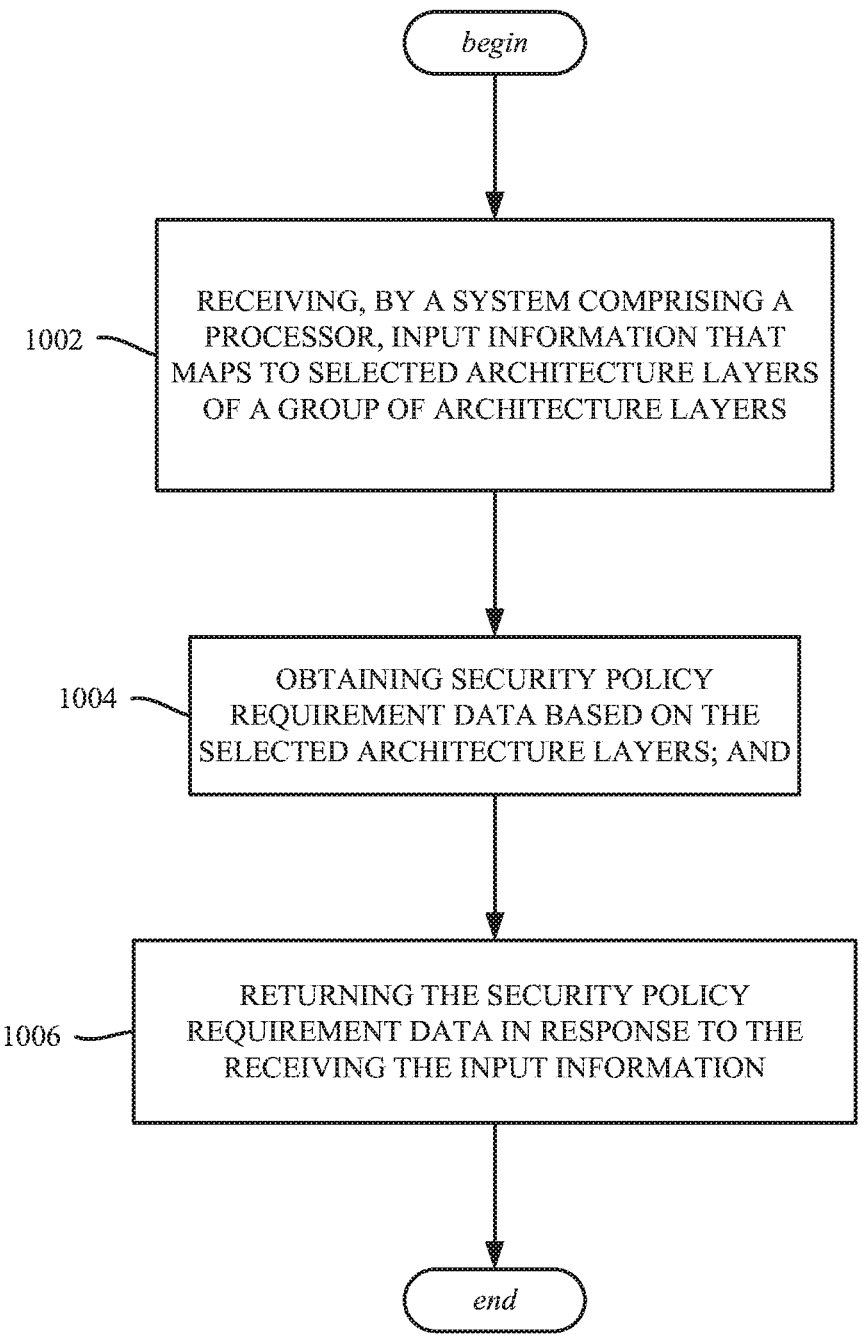
FIG. 10 illustrates example operations that map user input to selected architecture layers, and obtaining security policy requirement data based on the selected architecture layers, in accordance with various aspects and embodiments of the subject disclosure.

One or more example aspects are represented in FIG. 10, and can correspond to operations of a method. Operation 1002 represents receiving, by a system comprising a processor, input information that maps to selected architecture layers of a group of architecture layers. Operation 1004 represents obtaining security policy requirement data based on the selected architecture layers. Operation 1006 represents returning the security policy requirement data in response to the receiving of the input information.

The cloud environment can be a first party enterprise cloud environment, and the input information can map to cloud owner selected architecture layers, or map to cloud tenant code deployment-based selected architecture layers comprising container without virtual machine selected architecture layers, virtual machine without container selected architecture layers, or virtual machine and container selected architecture layers.

The cloud environment can be a third party enterprise cloud environment, the input information can indicate first party responsibility data that can indicate an infrastructure as a service (IaaS) service model, a platform as a service (PaaS) service model or a software as a service (SaaS) service model.

Obtaining the security policy requirement data based on the selected architecture layers can include determining at least two of: a data layer, an interfaces layer, an application layer, a solution stack layer, an operating systems layer, a virtual machines layer, a container layer, a virtual networks layer, a hypervisors layer, a processing and memory layer, a data storage layer, a physical network layer or a physical facilities layer.

Obtaining the security policy requirement data can include obtaining security policy requirement data for at least one of: first party enterprise security policy requirement data, or contract-specific security policy requirement data.

Obtaining the security policy requirement data can include obtaining first party enterprise security policy requirement data for a data layer and an interfaces layer, and obtaining, for other cloud-related layers, at least one of: first party enterprise security policy requirement data or contract-specific security policy requirement data.

Figure 11:
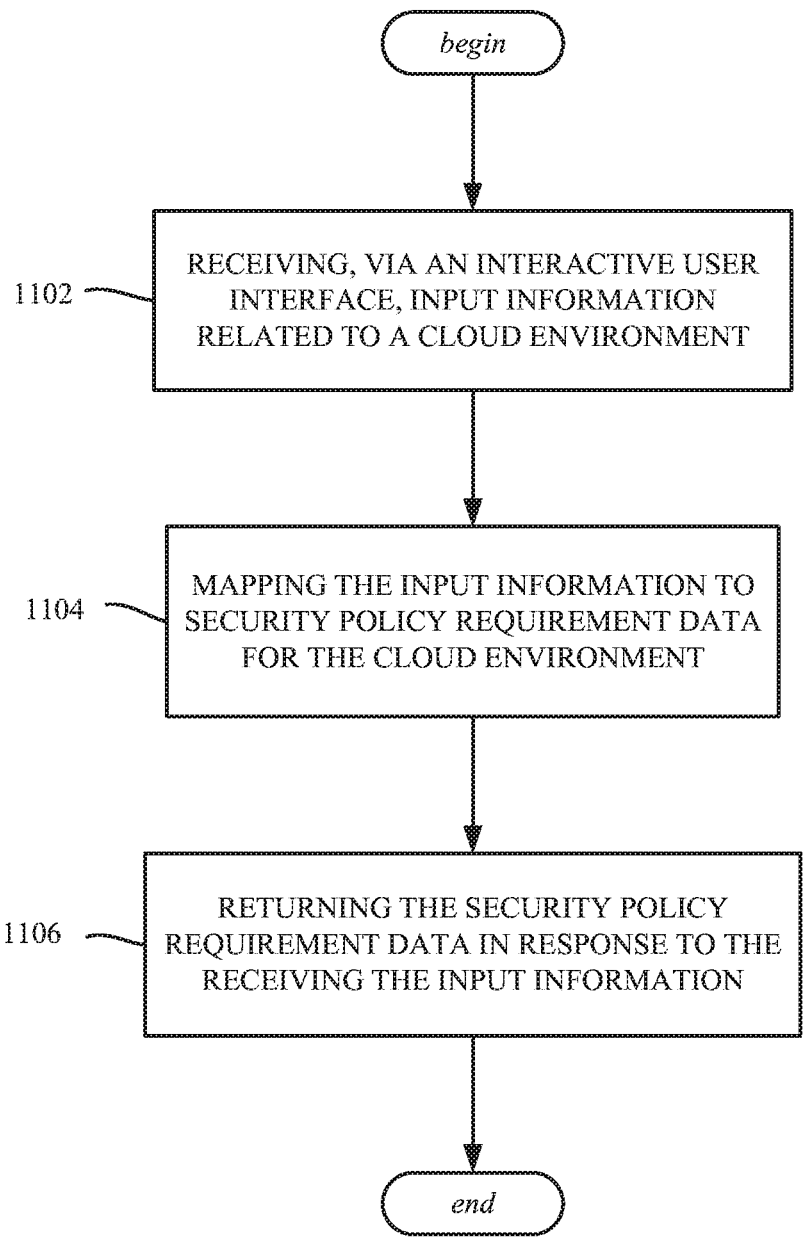
FIG. 11 illustrates example operations that return security policy requirement data in response to cloud environment-related input information, in accordance with various aspects and embodiments of the subject disclosure.

One or more aspects are represented in FIG. 11, such as implemented in a machine-readable storage medium, comprising executable instructions that, when executed by a processor, facilitate performance of operations. Example operation 1102 represents receiving, via an interactive user interface, input information related to a cloud environment. Example operation 1104 represents mapping the input information to security policy requirement data for the cloud environment. Example operation 1106 represents returning the security policy requirement data in response to the receiving the input information.

Mapping the input information to the security policy requirement data can include determining selected architecture layers of a group of architecture layers, and obtaining the security policy requirement data based on the selected architecture layers. Mapping the input information to the security policy requirement data can include determining selected architecture layers of a group of architecture layers, and obtaining the security policy requirement data based on the selected architecture layers and based on whether the cloud environment is a first party enterprise cloud environment or a third party enterprise cloud environment.

As can be seen, the technology described herein takes user input (e.g., a table of possible user responses) that correlate to cloud environments and joins these answers with architecture layers that are in scope when that answer is selected. The resulting architecture layers are then joined with security requirements that have been tagged to the in-scope architecture layers. This solution effectively maps the answers to questions that require limited technical and security knowledge to an enterprise's security policy requirements. This allows users with no knowledge of security and only limited knowledge about their technical workloads to answer simple questions and instantly receive a list of relevant security requirements.

A significant benefit of this technology includes the time and other resources saved in delivering relevant security requirements, e.g., to a technical team. As a result, such a team has more time to meet requirements than determining which requirements have to be met. Another benefit of this technology is that someone without any background in security and only a high-level knowledge of a team's technical workload can answer questions/fill out a report to receive the appropriate security requirements. Additionally, technology facilitates consistency in received security requirements by ensuring that that teams with similar technical workloads receive the same requirements from the security policy base, which is often not the case when security experts have to manually determine requirements for teams.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 12:
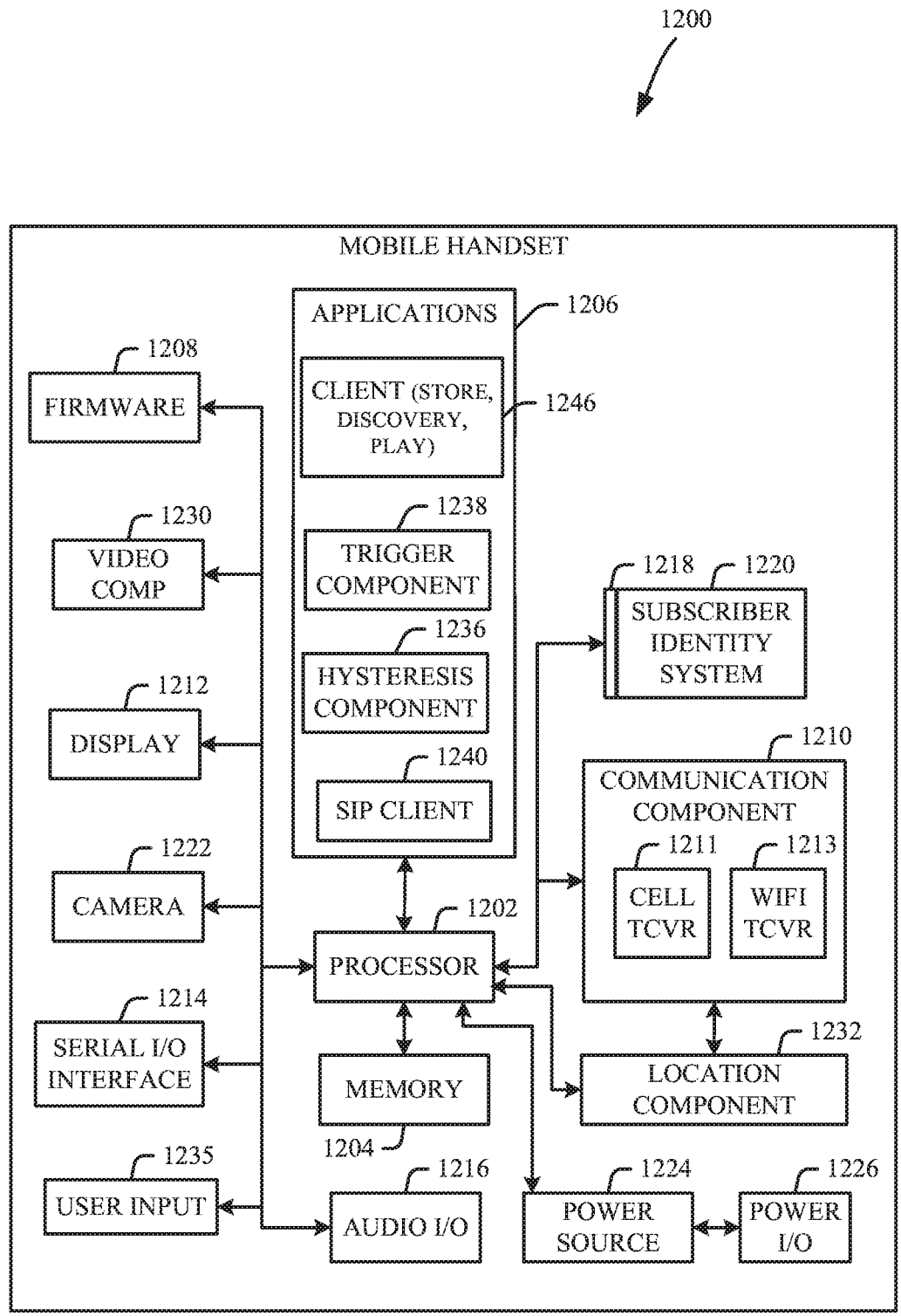
FIG. 12 illustrates an example block diagram of an example mobile handset operable to engage in a system architecture that facilitates wireless communications according to one or more embodiments described herein.

Referring now to FIG. 12, illustrated is a schematic block diagram of an example end-user device such as a user equipment) that can be a mobile device 1200 capable of connecting to a network in accordance with some embodiments described herein. Although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment 1200 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1200 includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1294) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communication component 1210 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 810, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
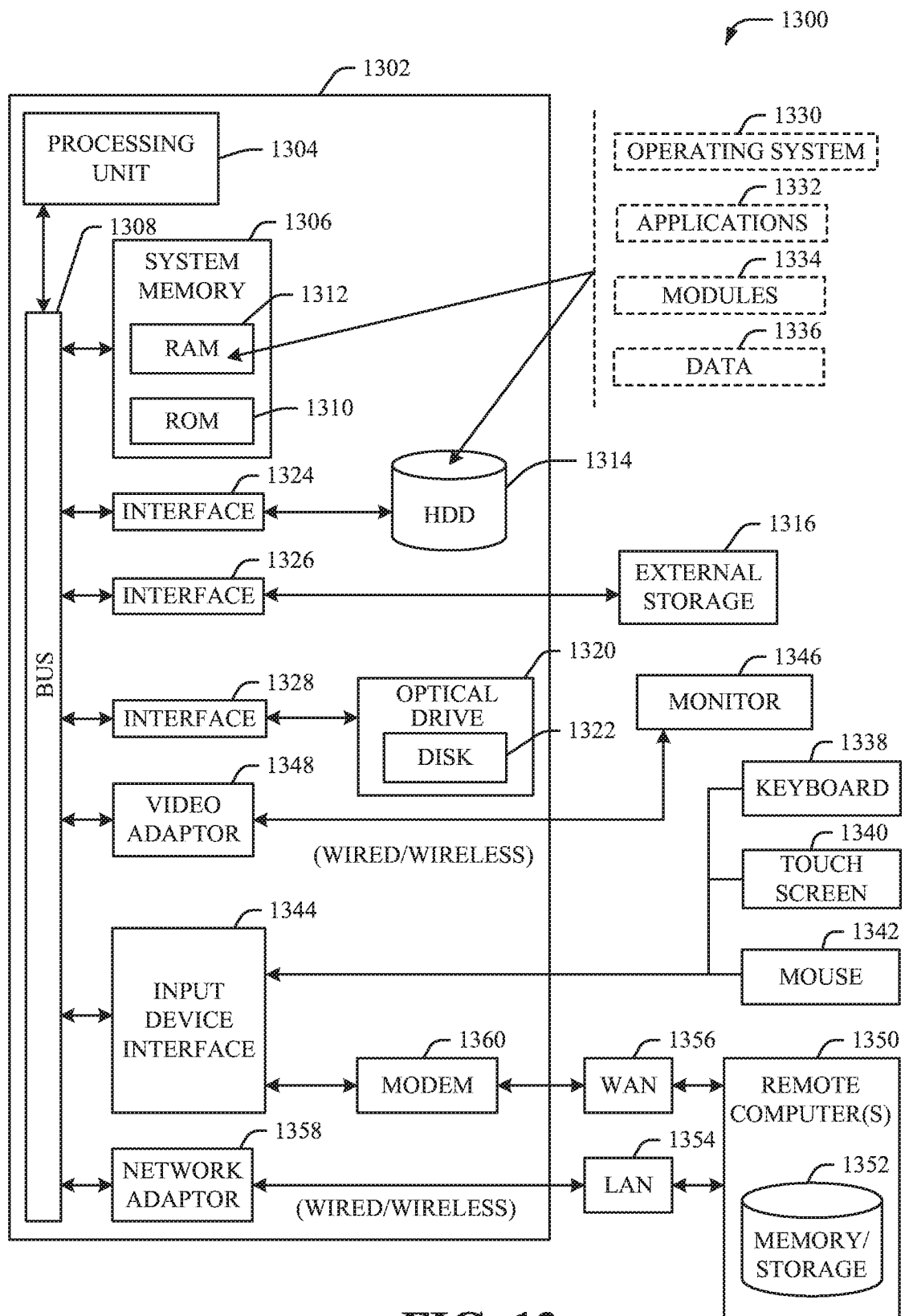
FIG. 13 illustrates an example block diagram of an example computer/machine system operable to engage in a system architecture that facilitates wireless communications according to one or more embodiments described herein.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD), non-volatile memory and other storage technology could be used in addition to, or in place of, an HDD 1314, and can be internal or external. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally include emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can include one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 13 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions which, when executed by the processor, facilitate performance of operations, the operations comprising:
      engaging in a question and answer wizard interaction based on user input associated with a user, comprising:
         receiving first user input data identifying a specified cloud environment of available cloud environments,
         based on the specified cloud environment, presenting a question to the user related to identifying a service model associated with the specified cloud environment,
         in response to the question, receiving second user input data comprising an answer to the question,
         based on the answer, determining the service model,
         mapping the service model to in-scope architecture layers for the specified cloud environment,
         accessing security policy requirement data based on the in-scope architecture layers, and
         presenting the security policy requirement data as output to the user.

2. The system of claim 1, wherein the first user input data indicates a first party enterprise cloud environment, and wherein at least part of the security policy requirement data is first party enterprise security policy requirement data.

3. The system of claim 2, wherein the second user input data comprises a first part that differentiates between a cloud owner and a cloud tenant, and wherein for a cloud tenant, the second input further comprises a second part that identifies code deployment implementation information.

4. The system of claim 3, wherein the code deployment implementation maps to a container without virtual machine result set, a virtual machine without container architecture layer result set, or a virtual machine and container result set.

5. The system of claim 1, wherein the first user input data indicates a third party enterprise cloud environment, and wherein at least part of the security policy requirement data is contract-specific security policy requirement data.

6. The system of claim 5, wherein at least part of the second user input data identifies first party responsibility information.

7. The system of claim 6, wherein first party responsibility information differentiates between an infrastructure as a service (IaaS) service model, a platform as a service (PaaS) service model, and a software as a service (SaaS) service model.

8. The system of claim 7, wherein the service model is the IaaS service model, and wherein at least part of the second user input data comprises code deployment implementation that maps to an IaaS container without virtual machine result set, an IaaS virtual machine without container result set, or an IaaS virtual machine and container result set.

9. The system of claim 1, wherein the first user input data indicates a third party enterprise cloud environment, and wherein at least part of the second input identifies first party enterprise responsibility information.

10. The system of claim 1, wherein the in-scope architecture layers comprise at least one of: a data layer, an interfaces layer, an application layer, a solution stack layer, an operating systems layer, a virtual machines layer, a container layer, a virtual networks layer, a hypervisors layer, a processing and memory layer, a data storage layer, a physical network layer, or a physical facilities layer.

11. A method, comprising:
receiving, by a system comprising a processor, first user input information identifying a selected cloud environment of available cloud environments;
based on the selected cloud environment, displaying, by the system, a question related to identifying a service model associated with the selected cloud environment;
in response to the question, receiving, by the system, second user input information comprising a response to the question;
based on the response, determining, by the system, the service model;
mapping, by the system, the service model to selected architecture layers of a group of architecture layers;
obtaining, by the system, security policy requirement data based on the selected architecture layers; and
displaying, by the system, the security policy requirement data.

12. The method of claim 11, wherein the selected cloud environment is a first party enterprise cloud environment, and wherein the selected architecture layers comprise at least one of container without virtual machine selected architecture layers, virtual machine without container selected architecture layers, or virtual machine and container selected architecture layers.

13. The method of claim 11, wherein the selected cloud environment is a third party enterprise cloud environment, wherein the service model comprises an infrastructure as a service (IaaS) service model, a platform as a service (PaaS) service model or a software as a service (SaaS) service model.

14. The method of claim 11, wherein the selected architecture layers comprise at least two of: a data layer, an interfaces layer, an application layer, a solution stack layer, an operating systems layer, a virtual machines layer, a container layer, a virtual networks layer, a hypervisors layer, a processing and memory layer, a data storage layer, a physical network layer, or a physical facilities layer.

15. The method of claim 11, wherein the security policy requirement data comprises at least one of: first party enterprise security policy requirement data, or contract-specific security policy requirement data.

16. The method of claim 11, wherein obtaining the security policy requirement data comprises obtaining first party enterprise security policy requirement data for a data layer and an interfaces layer, and obtaining, for other cloud-related layers, at least one of: first party enterprise security policy requirement data or contract-specific security policy requirement data.

17. A non-transitory machine-readable medium, comprising executable instructions that, when executed by a processor, facilitate performance of operations, the operations comprising:
receiving, via an interactive user interface, first input information identifying a cloud environment of cloud environments;
based on the cloud environment, presenting, via the interactive user interface, questions related to identifying a service model associated with the cloud environment;
in response to the questions, receiving, via the interactive user interface, second input information comprising respective answers to the questions;
based on the respective answers, determining the service model;
mapping the service model to a subgroup of architecture layers of a group of architecture layers;
identifying, based on the subgroup of architecture layers, security policy requirement data for the cloud environment; and
returning, via the interactive user interface, the security policy requirement data.

18. The non-transitory machine-readable medium of claim 17, wherein the service model comprises an infrastructure as a service (IaaS) service model, a platform as a service (PaaS) service model or a software as a service (SaaS) service model.

19. The non-transitory machine-readable medium of claim 17, wherein the subgroup of architecture layers comprises at least one of: a data layer, an interfaces layer, an application layer, a solution stack layer, an operating systems layer, a virtual machines layer, a container layer, a virtual networks layer, a hypervisors layer, a processing and memory layer, a data storage layer, a physical network layer, or a physical facilities layer.

20. The non-transitory machine-readable medium of claim 17, where the cloud environment is one of a first party enterprise cloud environment or a third party enterprise cloud environment.

* * * * *